US006283424B1

(12) United States Patent
Wilson

(10) Patent No.: US 6,283,424 B1
(45) Date of Patent: Sep. 4, 2001

(54) DOWN RIGGER ADAPTER

(76) Inventor: Lee A. Wilson, 33006 - 17th Pl. S. #A104, Federal Way, WA (US) 98003

(*) Notice: Subject to any disclaimer, the term of this patent is extended or adjusted under 35 U.S.C. 154(b) by 0 days.

(21) Appl. No.: 09/570,190

(22) Filed: May 15, 2000

Related U.S. Application Data

(62) Division of application No. 09/218,856, filed on Dec. 21, 1998, now Pat. No. 6,082,688.

(51) Int. Cl.[7] .......... A47B 96/06

(52) U.S. Cl. .......... 248/222.11; 248/538

(58) Field of Search .......... 248/222.11, 223.41, 248/225.11, 514, 534, 535, 536, 537, 538, 539, 540, 541, 688, 689, 468, 480, 291.1; 43/21.2, 27.4

(56) References Cited

U.S. PATENT DOCUMENTS 1,162,608 * 11/1915 Hohl et al. .......... 248/514
3,162,408 * 12/1964 Markman .......... 248/515
3,889,908 * 6/1975 Larson .......... 248/515
4,093,171 * 6/1978 Mengo, Sr. .......... 248/515
4,156,320 * 5/1979 Kammeraad .......... 43/27.4
4,438,582 * 3/1984 Lummis .......... 43/27.4
4,603,500 * 8/1986 Harrison, Sr. .......... 43/21.2
4,901,970 * 2/1990 Moss et al. .......... 248/514

* cited by examiner

*Primary Examiner*—Anita King
*Assistant Examiner*—Naschica Morrison
(74) *Attorney, Agent, or Firm*—David L. Tingey

(57) ABSTRACT

An adapter plate replicates an interface to a down rigger mount such that the plate is received in the mount in the same manner as a down rigger. The down rigger mount includes a releasable means for securely receiving a down rigger and releasing the down rigger from its mount when the down rigger is not in use. The adapter plate is similarly secured and released. The adapter plate is further configured to receive a fishing pole holder mount. To enable a pole holder to be mounted to an incompatible down rigger mount, the pole holder, otherwise mountable to a boat gunnel, is mounted instead to matching bolt holes on the adapter plate. Because there is a variety of down rigger mounts, each different from the others, and it is not necessarily known which down rigger mount will be encountered on any given outing, a plurality of adapter plates is provided to achieve the desired interface to one of several down rigger mounts, each plate still receiving the pole holder mount.

9 Claims, 5 Drawing Sheets

64
62
10
61
63
11
11
36
31
35

DOWN RIGGER ADAPTER

This is a divisional application of this inventor's application filed in the United States Patent and Trademark Office on Dec. 21, 1998 and assigned Ser. No. 09/218,856, Pat. No. 6,082,688.

BACKGROUND OF THE INVENTION

1. Field of the Invention

This invention relates to down riggers and fishing pole holders, both typically mounted to a boat gunnel, and, more specifically, to an adapter plate that allows a fishing pole holder to be mounted in a down rigger mount.

2. Prior Art

Down riggers are frequently used on fishing boats to guide a fishing line to a preferred water depth from where it is free to move in the water. A down rigger mount is characteristically mounted in a boat gunnel by drilling holes in the gunnel. The down rigger is then releasably secured in the mount during fishing. When the need for the down rigger is ended, it is removed from its mount and stored, but the mount remains bolted to the boat. A fishing pole holder is commonly mounted on or near the down rigger mount and provides the line guided by the down rigger to the preferred water depth. A pole mount is similarly mounted to the boat gunnel with mounting screws through holes drilled in the gunnel.

Clearly, it is not always desirable to employ a down rigger when fishing. In which case the down rigger mount remains unused. Several fishing lines are commonly in the water at one time, and often the number of pole mounts is less than the number of fishing lines. If the unused down rigger mount could be adapted to hold a fishing pole holder, another unmanned line could be in the water.

SUMMARY OF THE INVENTION

To enable a pole holder to be mounted to an incompatible down rigger mount, an adapter plate is provided. The pole holder, otherwise mountable to a boat gunnel, is mounted instead to matching bolt holes on the adapter plate. The down rigger mount includes a releasable means for securely receiving a down rigger and releasing the down rigger from its mount when the down rigger is not in use. The adapter plate therefore replicates the down rigger interface to the down rigger mount such that the plate is received in the mount in the same manner as a down rigger.

There is a variety of down rigger mounts, each different from the others, and it is not necessarily known which down rigger mount will be encountered on any given outing. A plurality of adapter plates is therefore provided to achieve the desired interface to one of several down rigger mounts, each plate still receiving the pole holder mount.

DETAILED DESCRIPTION OF THE PREFERRED EMBODIMENTS

Figure 1:
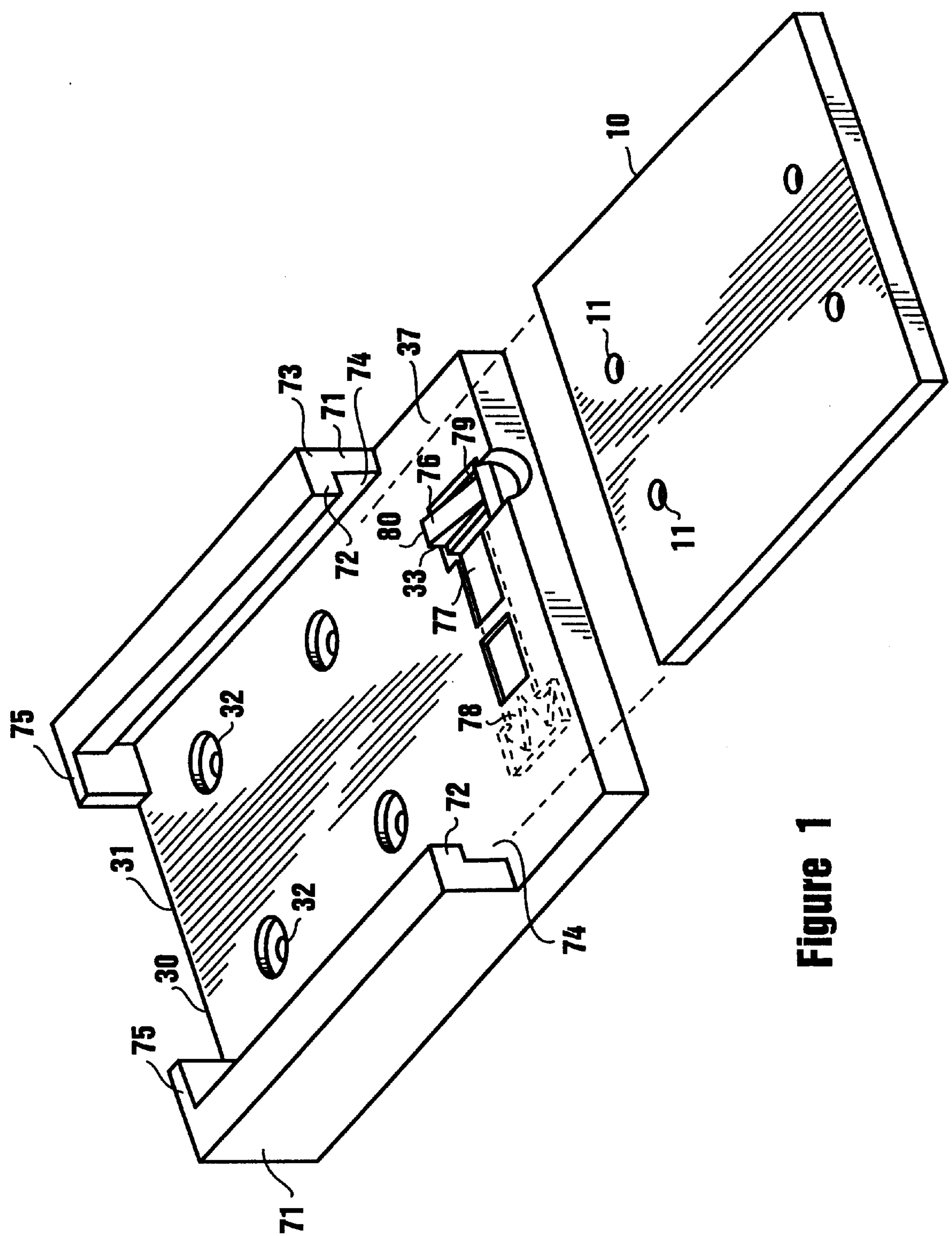
FIG. 1 is a perspective view of a down rigger mount with a release mechanism and an adapter plate configured to fit in a slot in the mount, retained therein by the release mechanism.
Figure 2:
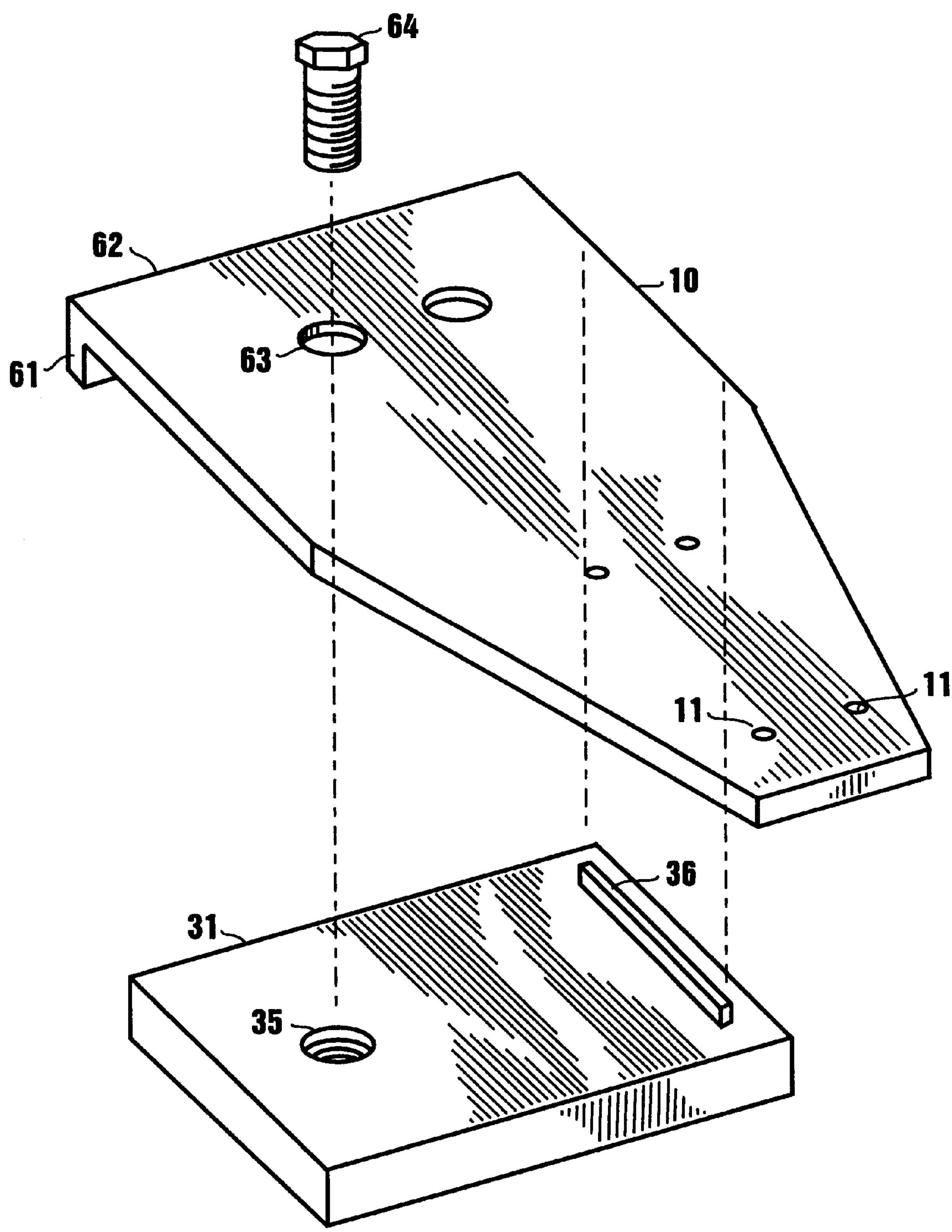
FIG. 2 is a perspective view of a down rigger mount with a side ridge with an adapter plate configured to fit on the mount, retained thereon by a bolt, the plate having a tongue extending beyond the mount.
Figure 3:
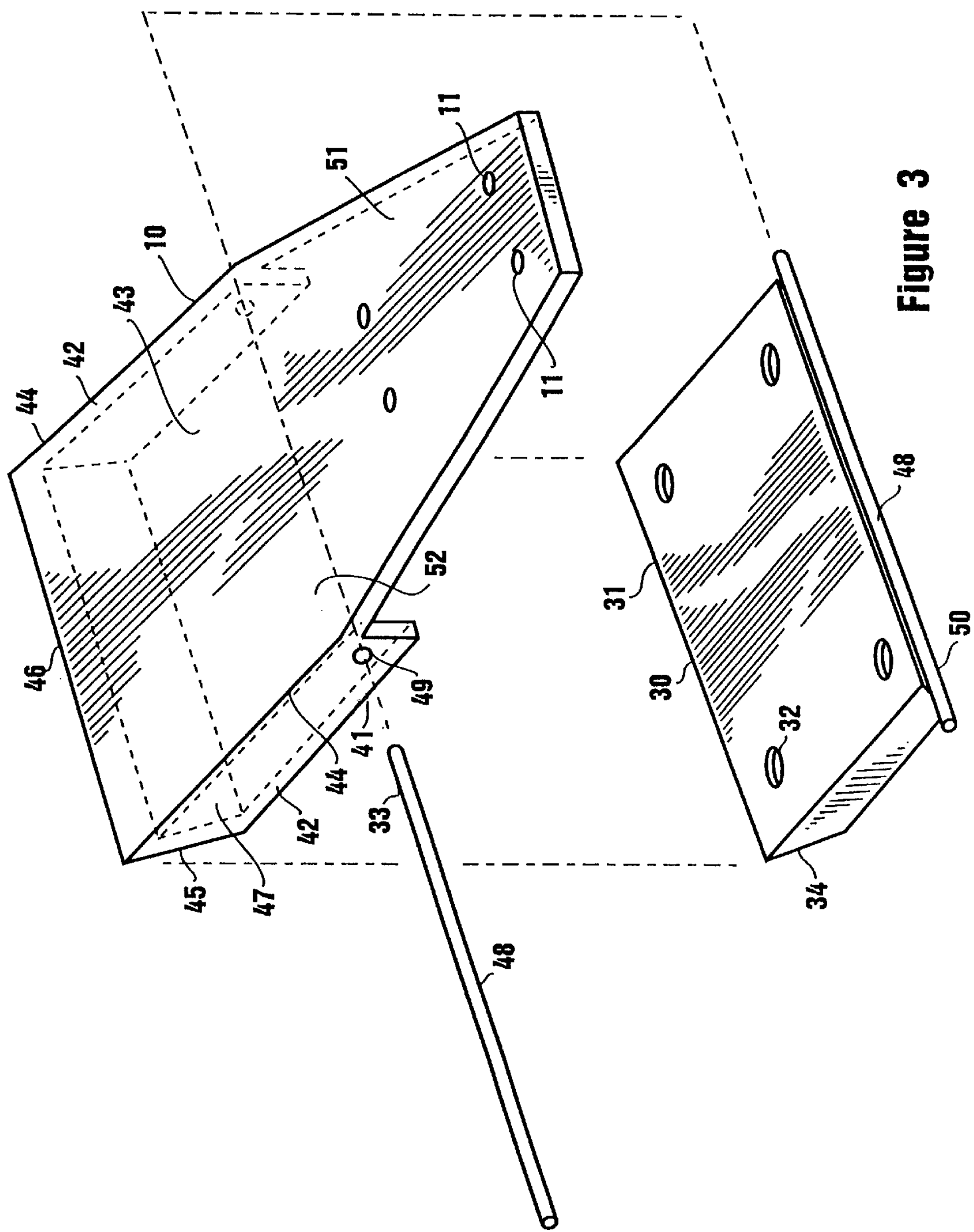
FIG. 3 is a perspective view of a down rigger mount with an adapter plate with side and back skirts mountable thereon by a retaining pin under a portion of the mount which retains the mount in and against the back skirt slanted to form a groove.
Figure 4:
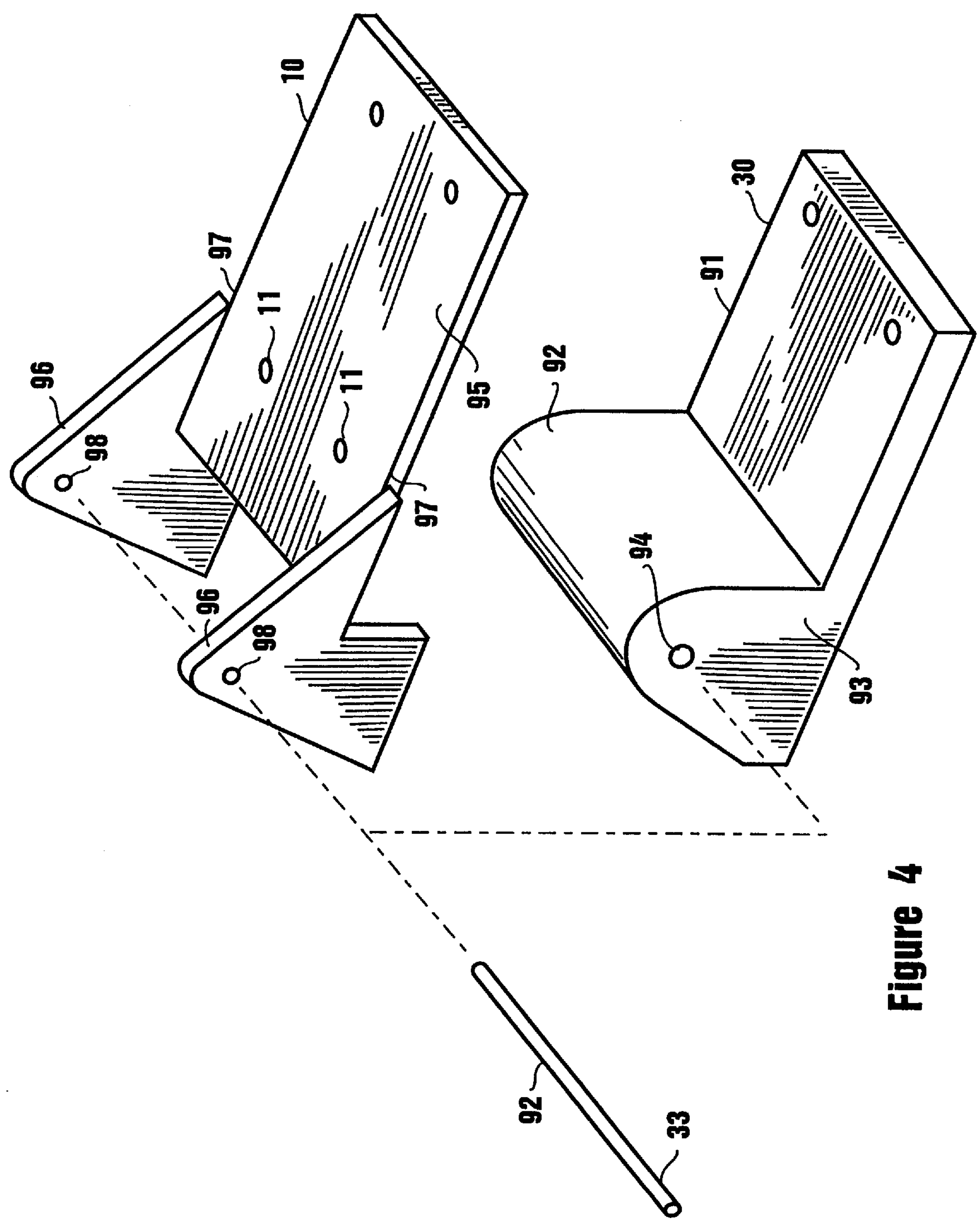
FIG. 4 is a perspective view of a down rigger mount having a housing rising from a flat portion and an adapter plate with opposing ears disposed such that the housing is pivotably secured between them by a pivot pin.
Figure 5:
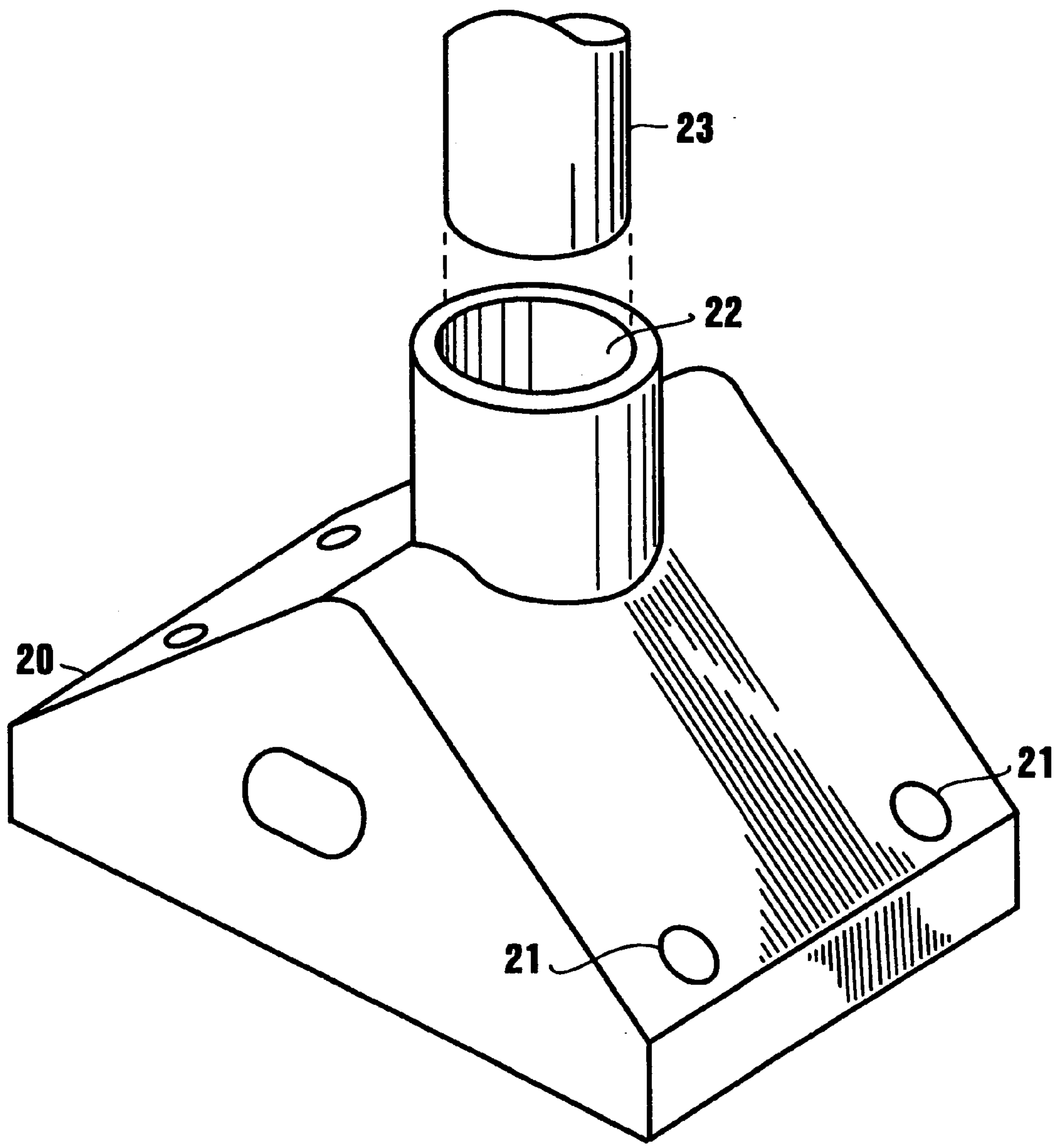
FIG. 5 is a perspective view of a pole holder mount and a shaft of a pole holder disposed to fit in the pole holder mount.

The present invention comprises an adapter plate 10 to be used in combination with a fishing pole holder mount 20 and an incompatible down rigger mount 30. A gunnel downrigger mount typically comprises a block 31 with a pattern of vertical bolt holes, typically four holes 32 in a rectangular arrangement, for mounting the downrigger mount to a boat gunnel with bolts. The gunnel down rigger mount includes a releasable mounting means 33 for releasably mounting a downrigger to the mount.

The fishing pole holder mount 20, generally intended to be mounted to a boat gunnel in the same manner as a down rigger mount, also typically has a defined bolt hole pattern of vertical holes, usually also four holes 21 in a rectangular pattern different from the gunnel down rigger bolt hole pattern. The pole holder mount characteristically has a hole 22 configured to removably receive a pole holder 23 securely therein.

To exploit the down rigger mount as a fishing pole holder, the adapter plate 10 is provided on which the fishing pole holder mount 20 is mounted instead of on the boat gunnel or a compatible down rigger mount. The adapter plate is then releasably receivable into the down rigger mount with which it is designed to be compatible. The adaptor plate includes an adaptor plate bolt pattern of vertical holes matching the fishing pole holder mount bolt hole pattern and is adapted such that said pole holder mount is securable thereon. It is further configured to match the releasable mounting means 33 of the down rigger mount such that the adaptor plate with fishing pole holder mount attached thereto is releasably secured to the down rigger mount in its releasable mounting means.

In a first embodiment, the adaptor plate 10 includes two opposing side skirts 42 depending from a plate top 43 on two sides 41 and separated by a third side skirt 45 depending from a plate top back side 46 and curved to form a groove 47 into which a first portion 34 of the down rigger mount is received. A releasable pin 48 passes through a hole 49 in each of the two side skirts and is secured between them, passing under a second portion 50 of the down rigger mount such that with the adaptor plate mounted over the down rigger mount with said first portion in said groove and the pin removably secured under the second portion of the down rigger mount, the adaptor plate is releasably secured to the down rigger mount. The adapter plate may further comprise a tongue portion extending from a top front side 52 opposite the back side to which the pole holder is mounted.

In a second embodiment, the adaptor plate 10 may comprise a back side skirt 61 depending from a plate top back side 62. The adapter plate is then adapted to fit with its back side skirt close against the down rigger block 31. A bolt hole 63 in the adapter plate matches a threaded hole 35 in the down rigger mount through which a bolt 64 passes in securing the adapter plate to the down rigger mount without swiveling. The down rigger mount may further comprise a side ridge 36, the adapter plate adapted to fit against the ridge to further prevent swiveling of the adapter plate on the down rigger mount.

In a further embodiment, opposing side walls 71 rise from the block 31 each ending with a lip 72 extending from the wall distal end 73 over the block toward each other forming a slot 74 for receiving the adapter plate therein. An end tab 75 is disposed on the block as a stop for limiting the travel of the adapter plate in the slot. A releasable locking mechanism 76 is provided on the block that allows the adapter plate to slide over and past the locking mechanism into the slot but preventing it from escaping from the slot until the mechanism is released. Typically, the mechanism comprises a resilient member 77 with spring action. One end 78 of the member is attached to the block, and its other end 79 includes a projection 80 rising above the block top 37 on which the pole holder mount slides. Thus, the adapter plate with the pole holder mount slides into the slot when the projection is urged downward below the block top but springs back above the top when the adapter plate slides past the projection to prevent the pole holder mount from escaping the slot.

In a last embodiment, the down rigger mount comprises a plate portion 91 and a pivot pin housing 92 rising from the plate portion at a plate portion end 93 with a bore 94 therethrough. The adapter plate comprises a flat portion 95 on which the pole holder mount may be mounted and an ear 96 on each side 97 extending beyond the flat portion having a pin hole 98 in each ear. The pivot pin housing fits between the adapter plate ears with the ear holes aligned with the housing bore. The removable pivot pin 92 passes through the ear holes and the housing bore to releasable secure the adapter plate pivotably to the down rigger mount.

What is claimed is:

1. A downrigger adapter comprising the combination of (1) a selective fishing pole holder mount having a first bolt hole pattern of vertical holes for mounting on a first boat gunnel and a fishing pole holder mount pole hole adapted to removably receive a pole securely therein, (2) a gunnel downrigger mount attachable to a second boat gunnel possibly but not necessarily the same as the first boat gunnel and having a second bolt hole pattern different from the first bolt hole pattern, and (3) an adaptor plate independent and separable from both the fishing pole holder and the downrigger mount and adapted to receive removably mounted thereto the fishing pole holder mount and further adapted to fit releasably on the gunnel downrigger mount, the adapter plate having a third bolt hole pattern having a plurality of vertical holes matching and aligned with the first bolt hole pattern to which the pole holder mount can be removably attached by bolts passing through said aligned holes of the first and third bolt hole patterns such that the pole holder mount which has pole holder mount vertical holes in said first bolt hole pattern not in alignment with vertical holes of the downrigger mount in said second hole pattern can thereby be secured on the downrigger mount.

2. The downrigger adapter of claim 1 further comprising a releasable mounting means on the gunnel downrigger mount for releasably securing a downrigger in the gunnel downrigger mount.

3. The combination of claim 1 wherein the downrigger mount comprises a block including means for mounting the block to the second boat gunnel and wherein the adaptor plate comprises two opposing side skirts depending from a plate top on two sides and separated by a third side skirt also depending from a plate top back side and curved to form a groove into which a first portion of the down rigger mount is received, a pin releasably passing through a hole in each of the two side skirts and secured between the two sides and under a second portion of the down rigger mount such that with the adaptor plate mounted over the down rigger mount with said first portion in said groove and the pin removably secured under the second portion of the down rigger mount, the adaptor plate is releasably secured to the down rigger mount.

4. The combination of claim 3 in which the adapter plate further comprises a tongue portion extending from a top front side opposite the back side and adapted to receive said pole holder mount securable thereto.

5. The combination of claim 1 wherein the down rigger mount comprises a block including means for mounting the block to the second boat gunnel and wherein the adaptor plate comprises a back side skirt depending from a plate top back side, the adapter plate adapted to fit with said back side skirt close against the down rigger block, and a bolt hole in the adapter plate and a threaded hole in the down rigger mount through which a bolt passes such that the adapter plate is secured to the down rigger mount without swiveling.

6. The combination of claim 5 wherein the down rigger mount further comprises a side ridge, the adapter plate adapted to fit against the ridge to further prevent swiveling of the adapter plate on the down rigger mount.

7. The combination of claim 1 wherein the down rigger mount comprises a plate portion, and a pivot pin housing at a plate portion end with a bore therethrough, and wherein the adapter plate comprises a flat portion on which the pole holder mount may be mounted and an ear on each side extending beyond the flat portion having a pin hole in each ear, the pivot pin housing fitting between the adapter plate ears with the ear holes aligned with the housing bore, a removable pivot pin passing through the ear holes and the housing bore to pivotably secure the adapter plate to the down rigger mount.

8. A down rigger adapter comprising the combination of a fishing pole holder mount having a first bolt hole pattern of a plurality of vertical holes for mounting on a boat gunnel and a pole holder mount pole hole adapted to removably receive a pole holder securely therein, a gunnel down rigger mount attachable to a first boat gunnel, releasable mounting means in the down rigger mount adapted to releasably mount a downrigger thereon, a selective adaptor plate matching said down rigger mount to fit releasably on the gunnel down rigger mount and to which the pole holder mount can be attached such that the pole holder mount can be secured on the down rigger mount, wherein said adaptor plate includes an adaptor plate third bolt hole pattern of a plurality of vertical holes matching the fishing pole holder mount first bolt hole pattern and adapted such that said fishing pole holder mount is securable thereon by bolts passing through aligned vertical holes of said first and third hole patterns, said adaptor plate further configured to match the releasable mounting means of the down rigger such that the adaptor plate with fishing pole holder mount attached thereto is releasably secured to the down rigger mount by said releasable mounting means.

9. The down rigger adapter of claim 8 wherein the adapter plate is selected from the group consisting of:

a. an adapter plate including a rectangular block configured to match a down rigger mount comprising a block, opposing side walls rising from the block each ending with a lip extending from a wall distal end over the block toward each other forming a slot for receiving the adapter plate therein, and an end tab on the block disposed as a stop for limiting travel of the adapter plate in the slot, and a releasable locking mechanism on the block allowing the adapter plate to slide past the locking mechanism into the slot but preventing the adaptor plate from escaping from the slot until the mechanism is released;

b. an adapter plate including two opposing side skirts depending from a plate top on two sides and separated by a third side skirt also depending from a plate top back side and curved to form a groove into which a first portion of the down rigger mount is received, and a pin releasably passing through a hole in each of the two side skirts and secured between the two sides and under a second portion of the down rigger mount such that with the adaptor plate mounted over the down rigger mount with said first portion in said groove and the pin removably secured under the second portion of the down rigger mount, the adaptor plate is releasably secured to the down rigger mount;

c. an adapter plate including two opposing side skirts depending from a plate top on two sides and separated by a third side skirt also depending from a plate top back side and curved to form a groove into which a first portion of the down rigger mount is received, and a pin releasably passing through a hole in each of the two side skirts and secured between the two sides and under a second portion of the down rigger mount such that with the adaptor plate mounted over the down rigger mount with said first portion in said groove and the pin removably secured under the second portion of the down rigger mount, the adaptor plate is releasably secured to the down rigger mount in which the adapter plate further comprises a tongue portion extending from a top front side opposite the back side and adapted to receive said pole holder mount securable thereto; and d. an adapter plate including a back side skirt depending from a plate top back side, the adapter plate adapted to fit with said back side skirt close against a down rigger block, and a bolt hole in the adapter plate and a threaded hole in the down rigger mount through which a bolt passes such that the adapter plate is secured to the down rigger mount without swiveling.

* * * * *